(12) United States Patent
Ciungan

(10) Patent No.: US 7,513,469 B1
(45) Date of Patent: Apr. 7, 2009

(54) MOUNTING SYSTEM WITH VERTICAL ADJUSTMENT FEATURE

(75) Inventor: Marcel Ciungan, Arlington Heights, IL (US)

(73) Assignee: Peerless Industries, Inc., Melrose Park, IL (US)

( * ) Notice: Subject to any disclaimer, the term of this patent is extended or adjusted under 35 U.S.C. 154(b) by 31 days.

(21) Appl. No.: 11/645,374

(22) Filed: Dec. 26, 2006

Related U.S. Application Data

(60) Provisional application No. 60/756,286, filed on Jan. 5, 2006.

(51) Int. Cl.
*F16M 11/00* (2006.01)

(52) U.S. Cl. .................. 248/161; 248/917; 248/919; 248/921

(58) Field of Classification Search ......... 248/917–923, 248/161, 406.1, 406.2, 276.1, 274.1, 279.1, 248/285.1

See application file for complete search history.

(56) References Cited

U.S. PATENT DOCUMENTS

| | | | | |
|---|---|---|---|---|
| 4,030,749 A | * | 6/1977 | Strahm | 297/344.18 |
| 4,126,939 A | * | 11/1978 | Pyne, Jr. | 433/79 |
| 4,615,279 A | * | 10/1986 | de la Haye | 108/147 |
| 6,126,128 A | | 10/2000 | Costa et al. | |
| 6,343,006 B1 | | 1/2002 | Moscovitch et al. | |
| 6,418,010 B1 | | 7/2002 | Sawyer | |
| 6,480,172 B1 | | 11/2002 | Sawyer | |
| D497,537 S | | 10/2004 | O'Keene et al. | |
| 6,905,101 B1 | | 6/2005 | Dittmer | |
| D530,595 S | | 10/2006 | Lam et al. | |
| 7,152,836 B2 | | 12/2006 | Pfister et al. | |
| 2004/0084579 A1 | | 5/2004 | Lee et al. | |
| 2006/0284037 A1 | | 12/2006 | Dittmer et al. | |

OTHER PUBLICATIONS

Peerless Product Guide 2003, Audiovisual Mounts and Display Solutions, pp. 6-9.

* cited by examiner

*Primary Examiner*—Amy J. Sterling
(74) *Attorney, Agent, or Firm*—Foley & Lardner LLP

(57) ABSTRACT

A vertical adjustment feature for a mounting system, such as a mounting system with a single articulating arm. A tool such as a hex wrench is used to rotate an adjustment bolt, which is threadedly engaged with a threaded nut. An axle is slidably received within a support arm end. Slots are positioned on the left and right sides near the top end of the primary axle. The primary axle slides up and down within the support arm end in conjunction with rotation of the adjustment bolt, enabling an associated flat panel television or other display device to move upwards or downwards relative to a wall or other support surface.

20 Claims, 4 Drawing Sheets

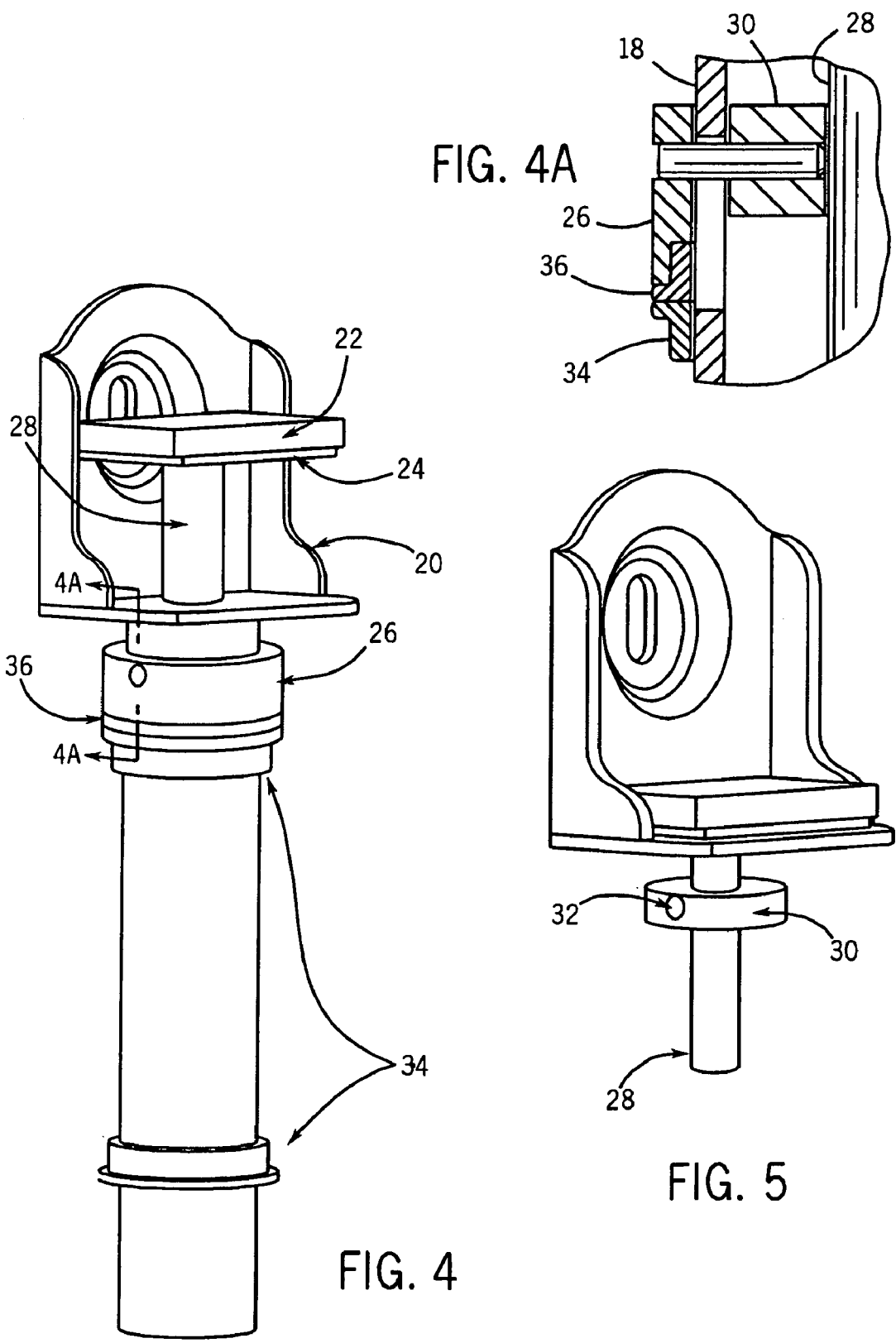

MOUNTING SYSTEM WITH VERTICAL ADJUSTMENT FEATURE

CROSS-REFERENCE TO RELATED APPLICATIONS

The present application claims priority to U.S. Provisional Patent Application No. 60/756,286, filed Jan. 5, 2006 and incorporated herein by reference in its entirety.

FIELD OF THE INVENTION

The present invention relates generally to mounting systems. More particularly, the present invention relates to mounting systems for flat panel televisions with articulating arms, where the vertical position of the television can be adjusted after installation.

BACKGROUND OF THE INVENTION

In recent years, flat panel televisions have become enormously popular in both commercial and residential sectors. As the prices for plasma and liquid crystal display (LCD) flat panel displays have continued to fall, and the quality for the same devices have improved, more and more businesses and individuals have purchased such devices for both home and business entertainment purposes.

One of the advantages of flat panel television units that customers have found particular appealing is their relatively low thickness. Because conventional "tube" televisions have a relatively large depth, the display options for such devices are quite limited. In the residential setting, most users require a television stand or large entertainment center to store the television. Such stands or entertainment centers can take up significant floor space, which is often undesirable. In the commercial or educational setting, users will often install large overhead mounting systems that can contain the television. However these systems usually require professional installation and, once the television is secured to the mount, it is often difficult to access and adjust due to its height. With flat panel televisions, on the other hand, users are presented with a relatively new option: mounting the television directly to the wall. By mounting the television to the wall, a person can eliminate the need to take up potentially valuable floor space.

Although the introduction of flat panel televisions on a wide scale has presented new opportunities to both residential and commercial customers, it has also presented new challenges. In particular, flat panel televisions, while usually having significantly smaller depth or profile than conventional "tube" televisions, tend to be quite heavy. Particularly for flat panel televisions with large screens, this weight can become also prohibitively great. With such large weights involved, it is especially important that users can easily, safely, and securely mount the devices without having to make substantial adjustments. Furthermore, with such weights involved and the high cost of such devices, it is extremely important that the device be mounted correctly on the first attempt: if the device is not correctly mounted on the first try, there is a high risk of damaging the device and causing injury to those installing it.

With the above considerations in mind, there have been various attempts to develop mounting systems that address these concerns. Besides the flat wall mounts, there have been articulating arm mounts produced. This type in general allow a flat panel to be placed flat against the wall, or moved straight out away from the wall varying distances (mount dependant) and swing left or right, limited only by TV-to-wall contact. These articulating mounts add tremendous variety to flat panel television viewing including straight, or any variation of up to 90 degrees left or right of straight. Installations can also recess the flat panel television into a cabinet (with an articulating mount) flush with the outer wall surface. The articulating mount then allows the TV to come out of the recess and pivot left or right providing infinite additional viewing angles.

Flat panel televisions are ever increasing in size, and as they become less expensive, consumers are buying the largest they can afford. Flat panel televisions also conveniently provide twice the screen size of a "tube" unit, for a more enjoyable viewing experience. Customers are trying to fit the largest flat panel television into limited space: such as just above a fire place mantel, or in a corner up against the ceiling. These examples require a specific fine tuning of the vertical position of the television for the perfect installation effect, while still maintaining the television swivel left and right feature.

Some newer flat panel television mounts also include an articulating arm which permits the television to be moved away from a wall or other surface. One such single articulating arm mount is designed to primarily hold larger flat panel television units. Such a mount typically includes a welded wall bracket that is connected to the wall using fasteners such as wood screws. The wall bracket is connected to a set of articulating arms via metal tubing. The articulating arm is connected to a set of components that permit the flat panel television, when attached to the mount, to tilt, roll, and rotate relative to a wall or other mounting surface. This style of mount is used not only on a wall, but often is mounted on a recessed opening which is cut out of or built into the wall or mounting surface. In the application of the mount being positioned on a surface that is not recessed, the end user or installer may need to adjust the vertical positioning of the television in order to obtain a preferred viewing location. In the case where the mount is installed within a recessed opening, the installer may need to adjust the vertical position to account for any variance in the original positioning of the mount relative to the opening, or any displacement that may be natural to the mount itself.

SUMMARY OF THE INVENTION

The present invention involves the use of a vertical adjustment feature in a television mounting system with a single articulating arm. The vertical adjustment feature of the present invention includes a main axle with slots on the left and right sides thereof. The axle slides up and down, and rotates relative to a support arm. A threaded nut fits inside the axle and is locked in place by fasteners or other connecting elements passing through the main axle slots from a sliding collar. An adjustment bolt threads into the threaded nut. A bolt retaining block is used to retain the adjustment bolt. The bolt retaining block includes an access hole, which allows a user to access the adjustment bolt. When the bolt is turned, the television or other mounted product is raised or lowered under its own weight.

The vertical adjustment feature of the present invention provides an installer with a very accessible point at which to adjust the vertical position of a flat panel television or other device that is being mounted. With the vertical adjustment being located just behind the television in a preferred embodiment of the invention, the installer has an easy point for adjustment, and a tool as simple as a common hex wrench may only be required for adjustment.

These and other advantages and features of the invention, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

FIG. 4 is a perspective view of a portion of the vertical adjustment system of FIG. 3 in a partially disassembled state;

FIG. 4A is a partial cross-sectional view of the portion of the vertical adjustment system of FIG. 4; and FIG. 5 is a perspective view showing hidden components within the vertical adjustment system of FIG. 4.

DETAILED DESCRIPTION OF THE PREFERRED EMBODIMENTS

Figure 1:
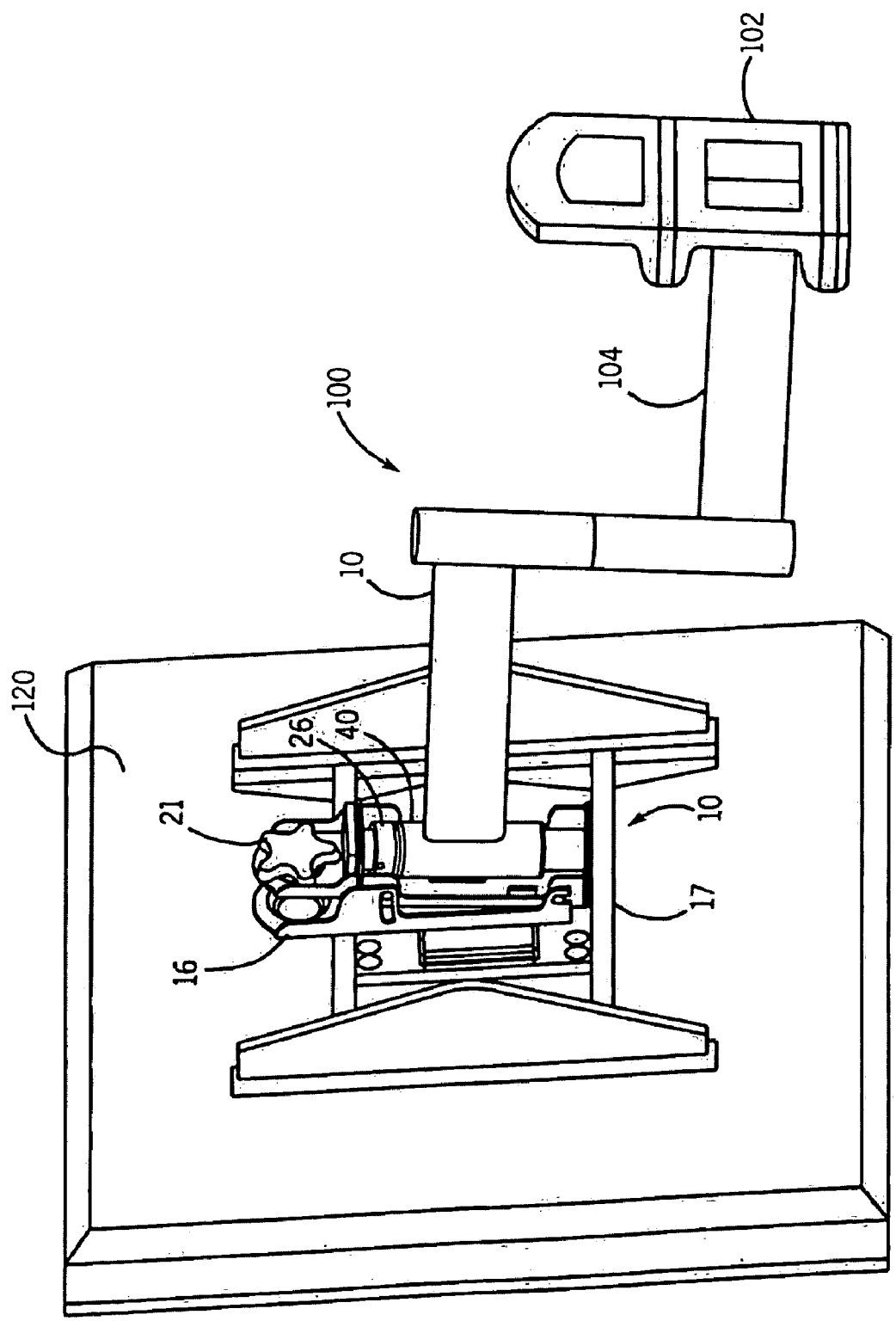
FIG. 1 is a first perspective view of a mounting system constructed in accordance with one embodiment of the present invention.
Figure 2:
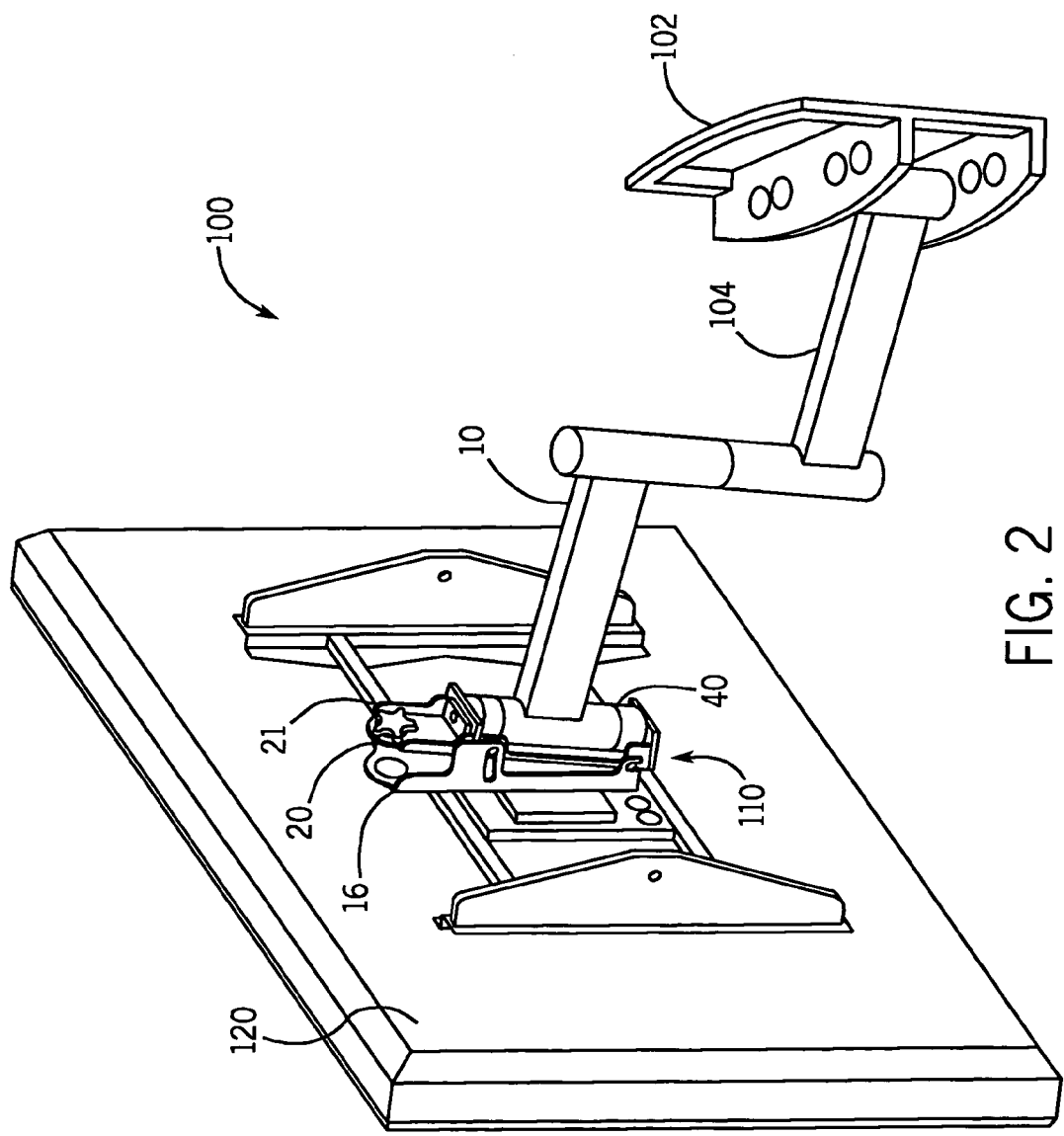
FIG. 2 is a second perspective view of a mounting system constructed in accordance with one embodiment of the present invention.

FIGS. 1 and 2 show a mounting system 100 constructed in accordance with one embodiment of the present invention. The mounting system 100 of FIGS. 1 and 2 includes a wall mounting plate 102 which is adapted to secure to a wall or other flat surface. A wall support arm 104 is rotatably connected to the wall mounting plate 102. When the wall mounting plate 102 is a affixed to a wall or other surface substantially perpendicular to the ground, the wall support arm 104 is capable of rotating about an axis substantially perpendicular to the ground. The wall support arm 104 is also rotatably connected to a single articulating support arm 10. The articulating support arm 10 is operatively connected to the vertical adjustment feature 110 of the present invention, which is operatively connected to a tilt plate 16. The tilt plate 16 is configured to selectively tilt relative to the vertical adjustment feature 110. In the embodiment of the invention shown in the attached Figures, an adjustment knob 21 is used to tilt the tilt plate 16 towards and away from a connected tilt box 17.

The tilt plate 16 is operatively connected to a mounting plate 12, which can directly or indirectly (e.g., via an adapter plate) connect to a display device 120. These components can be connected to each other via screws or other fasteners known in the art. In a preferred embodiment of the invention, the mounting system 100 is configured to support a flat panel television. However, other types of devices could also be mounted on the mounting system 100.

Figure 3:
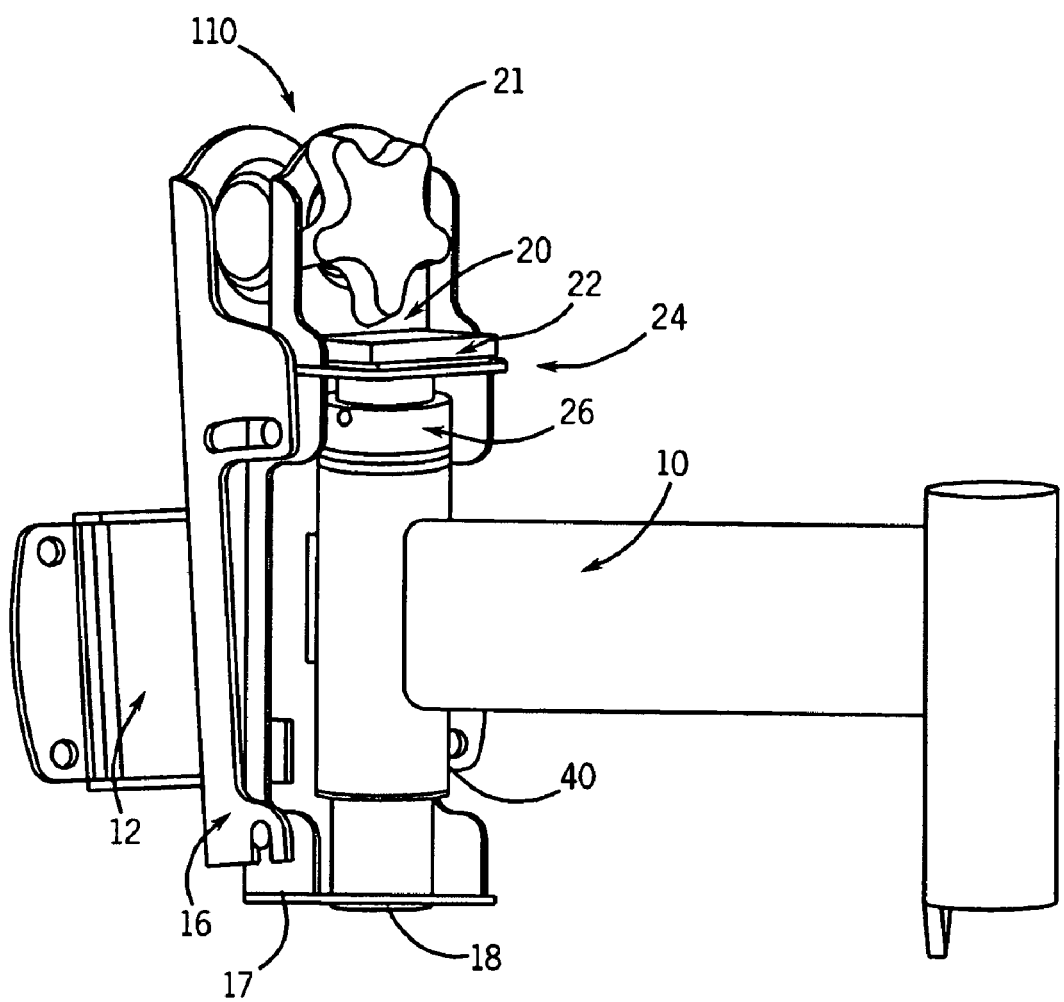
FIG. 3 is a perspective view of a vertical adjustment system formed as part of the mounting system of FIGS. 1 and 2.

FIG. 3 shows the vertical adjustment system 110, according to one embodiment of the present invention, in greater detail. As shown in FIG. 3, a primary axle 18 is slidably received within a support arm end 40 of the articulating support arm 10. In the embodiment shown in FIGS. 1-3, the support arm end 40 comprises a hollow tube securely fastened to the articulating support arm 10. Slots or similar guide paths are positioned on the left and right sides of the primary axle 18 near the top end of the primary axle 18. Two slots are used in one embodiment of the invention. However, it is also possible for more than two slots to be used as necessary or desired. The primary axle 18 slides up and down within the support arm end 40 and rotates within the support arm end 40.

As shown in FIGS. 3-5, a tilt stop plate 20 is secured on the top of the primary axle 18. This securement is accomplished via welding in one embodiment of the invention. A multiple threaded nut 30 fits inside the primary axle 18 and is locked in place by connecting elements that pass through the slots from an outer collar 26. In one embodiment of the invention, the threaded nut 30 comprises a dual threaded nut. However, it is also possible for other multiple-threaded nuts to be used. For example, the nut can include multiple threads that are 90 or 120 apart, or are separated by some other orientation. The connecting elements can comprise conventional locking fasteners, pins (such as spring pins), threaded rods, studs, standoffs, or other similar components. The outer collar 26 rests around an upper portion of the support arm end 40 and includes two openings about 180 degrees apart from each other for the locking fasteners 11. In one embodiment of the invention, it is possible for the outer collar 26 to be formed as one piece with the support arm end 40. A collar bushing 36 fits inside the sliding collar to aid in smooth motion of the primary axle 18 relative to the support arm end 40.

An adjustment bolt 28 protrudes through the tilt stop plate 20 and a stiffening plate 24 and threads into the threaded nut 30. A bolt holding block 22 is secured to a tilt stop plate 20 over the head of the adjustment bolt 28. An access hole in the bolt holding block 22 permits access to the head of the adjustment bolt 28.

The weight of the television or other display device 120 is transferred through the tilt plate 16, the tilt box 17, and the tilt stop plate 20 to the bolt holding block 22. In one embodiment of the invention, four fasteners are used to attach the bolt holding block 22 to the reinforcement plate 7 and the tilt box 17. The weight of the display device 120 essentially rests on the top of the adjustment bolt 28 inside the bolt holding block 22. The weight then is transferred through the adjustment bolt 28 to the threaded nut 30, across the locking screws 32 and into the outer collar 26. The outer collar 26 rests on the support arm end bushings 34 and the collar bushing 36 upon the end of the articulating support arm 10. Therefore the weight of the display device 120 keeps all of the components pushing downward on the adjustment bolt 28 to the articulating support arm 10. As discussed in detail below, turning the adjustment bolt 28 therefore raises or lowers the display device 120 within component limits, under the weight of the display device 120.

Once the mounting system 100 has been correctly installed, vertical adjustment may be necessary for a variety of reasons. To do so, the installer uses a tool (a hex wrench in one embodiment of the invention) to reach the adjustment bolt 28 through an opening in the bolt holding block 22. The installer rotates the adjustment bolt 28 in a clockwise direction to lower the display device 120 or counter-clockwise to raise the display device 120. In particular, when the adjustment bolt 28 is rotated, there is relative movement between the adjustment bolt 28 and the threaded nut 30. As locking screws 32 attach the threaded nut 30 to the outer collar 26, the outer collar 26 and the support arm end 40 do not move when the adjustment bolt 28 is rotated. The adjustment bolt 28 therefore acts either with or against the weight of the display device 120. In the case of a clockwise rotation of the adjustment bolt 28, the adjustment bolt 28 acts with the weight of the display device 120 to lower the connected tilt box 17, the tilt stop plate 20, and the primary axle 18, as well as the other attached components including the display device 120. The primary axle 18 is connected to the tilt stop plate 20 via welding or similar fastening mechanisms. If the adjustment bolt 28 acts against the weight of the display device 120, it causes these same components to move upwards relative to the outer collar 26 and the support arm end 40.

In a particular embodiment of the invention, the display device 120 can be adjusted upwards or downwards by up to about two inches. The amount of adjustment is limited by the length of the adjustment bolt 28 and length of the slots or guide paths within the primary axle 18.

One advantage to the incorporation and use of the vertical adjustment feature 110 of the present invention is the maintaining of a 180 degree swivel motion of the mounted display device. With the present invention, the display device 120 remains substantially free to rotate about 180 degrees to the left and right independent of the vertical adjustment position. In addition, the present invention also provides an improved level of security to the installer and user. In one embodiment of the invention, the fasteners that go into the bolt holding block 22 are hex with pin security type screws, and the locking fasteners 11 can also be security type fasteners. Such security fasteners help to prevent tampering with the vertical adjustment feature 110, which could lead to potential danger should the mounting system 100 come apart while a television or other display device 120 is attached thereto.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated.

What is claimed is:

1. A mounting system, comprising:
an articulating arm;
an axle slidably engaged with an end of the articulating arm;
an adjustment bolt positioned partially within the axle and threadedly engaged with a nut positioned within the axle;
a collar slidably engaged with the axle; and
at least one connecting element coupling the collar to the nut,
wherein rotation of the adjustment bolt results in a linear adjustment of the axle relative to the articulating arm.

2. The mounting system of claim 1, wherein the nut comprises a dual threaded nut.

3. The mounting system of claim 1, wherein the at least one connecting element comprise two fasteners positioned about 180 degrees apart from each other around the collar.

4. The mounting system of claim 1, further comprising a holding block coupled to the adjustment bolt, the holding block including an opening therein to permit access a head of the adjustment bolt.

5. The mounting system of claim 1, wherein the axle is positioned substantially perpendicular to the articulating arm.

6. The mounting system of claim 1, wherein the collar is formed as part of the end of the articulating arm.

7. The mounting system of claim 1, wherein the axle is configured to permit passage of the at least one connecting element to connect the collar to the nut.

8. The mounting system of claim 1, further comprising at least one support arm bushing positioned between the axle and the end of the articulating arm.

9. The mounting system of claim 1, further comprising at least one collar bushing positioned between the axle and the collar.

10. A mounting system, comprising:
a surface mounting plate;
an articulating arm operatively connected to the surface mounting plate;
an axle slidably engaged with an end of the articulating arm;
an adjustment bolt positioned partially within the axle and threadedly engaged with a nut positioned within the axle;
a collar slidably engaged with the axle; and
at least one connecting element coupling the collar to the nut,
wherein rotation of the adjustment bolt results in a linear adjustment of the axle relative to the collar.

11. The mounting system of claim 10, wherein the articulating arm is connected to the surface mounting plate via a wall support arm, the articulating arm and the wall support arm both being independently rotatable relative to the surface mounting plate.

12. The mounting system of claim 10, further comprising:
a tilt box coupled to an axle; and
a tilt plate movably engageable with the tilt box, wherein the tilt plate is tiltable relative to the tilt box.

13. The mounting system of claim 10, wherein the nut comprises a dual threaded nut.

14. The mounting system of claim 10, wherein the at least one connecting element comprise two fasteners positioned about 180 degrees apart from each other around the collar.

15. The mounting system of claim 10, wherein the at least one connecting element comprises at least one pin.

16. The mounting system of claim 10, further comprising a holding block coupled to the adjustment bolt, the holding block including an opening therein to permit access a head of the adjustment bolt.

17. The mounting system of claim 10, further comprising at least one support arm bushing positioned between the axle and the end of the articulating arm.

18. The mounting system of claim 10, further comprising at least one collar bushing positioned between the axle and the collar.

19. A mounting system, comprising:
an articulating arm;
an axle slidably engaged with an end of the articulating arm;
an adjustment bolt positioned partially within the axle and threadedly engaged with a nut;
a collar slidably engaged with the axle;
at least one connecting element coupling the collar to the nut; and
at least one support arm bushing positioned between the axle and the end of the articulating arm,
wherein rotation of the adjustment bolt results in a linear adjustment of the axle relative to the articulating arm.

20. A mounting system, comprising:
a surface mounting plate;
an articulating arm operatively connected to the surface mounting plate;
an axle slidably engaged with an end of the articulating arm;
an adjustment bolt positioned partially within the axle and threadedly engaged with a nut;
a collar slidably engaged with the axle;
at least one connecting element coupling the collar to the nut;
a tilt box coupled to an axle; and
a tilt plate movably engageable with the tilt box,
wherein the tilt plate is tiltable relative to the tilt box,
wherein rotation of the adjustment bolt results in a linear adjustment of the axle relative to the collar.

* * * * *